United States Patent [19]

Kallenbach

[11] Patent Number: 5,105,848

[45] Date of Patent: Apr. 21, 1992

[54] AUTOMATIC RELIEF VALVE

[75] Inventor: Dieter H. F. Kallenbach, Chartwell, South Africa

[73] Assignee: Zarina Holding C.V., Amsterdam, Netherlands

[21] Appl. No.: 707,626

[22] Filed: May 30, 1991

Related U.S. Application Data

[63] Continuation-in-part of Ser. No. 469,359, Jan. 24, 1990, Pat. No. 5,033,504.

[51] Int. Cl.⁵ .............................................. F16K 17/18
[52] U.S. Cl. .................................. 137/493.1; 137/523; 137/526; 137/846
[58] Field of Search ................... 137/102, 493, 493.1, 137/493.2, 526, 846, 849, 523

[56] References Cited

U.S. PATENT DOCUMENTS 1,038,685  9/1912  Titus .
2,431,457  11/1947 Bondurant .
3,086,542  4/1963  Mosier .
3,941,149  3/1976  Mittleman .
3,976,096  8/1976  Kass et al. .
4,458,711  7/1984  Flider .
4,493,339  2/1985  Porter, Jr. .

Primary Examiner—Robert G. Nilson
Attorney, Agent, or Firm—Kilpatrick & Cody

[57] ABSTRACT

A swimming pool cleaner relief valve comprising a body; a flow passage through the body having an inlet and an outlet for connection to a pipe having an induced flow therethrough; a bypass passage through the body connected to the flow passage and open to ambient conditions at a free end and having parallel ridges on its inner surface and a restriction at the free end; a flexible resilient diaphragm that slides coaxially within the bypass passage having a peripheral flange and a perforation permitting flow therethrough in only one direction and variable in size depending upon the degree of flexing of the diaphragm, and cooperating members movable in the parallel ridges to prevent complete withdrawal of the diaphragm from the bypass passage; and a collar having a ring with a recess that receives the flange and having serrated projections that engage the restriction.

11 Claims, 2 Drawing Sheets

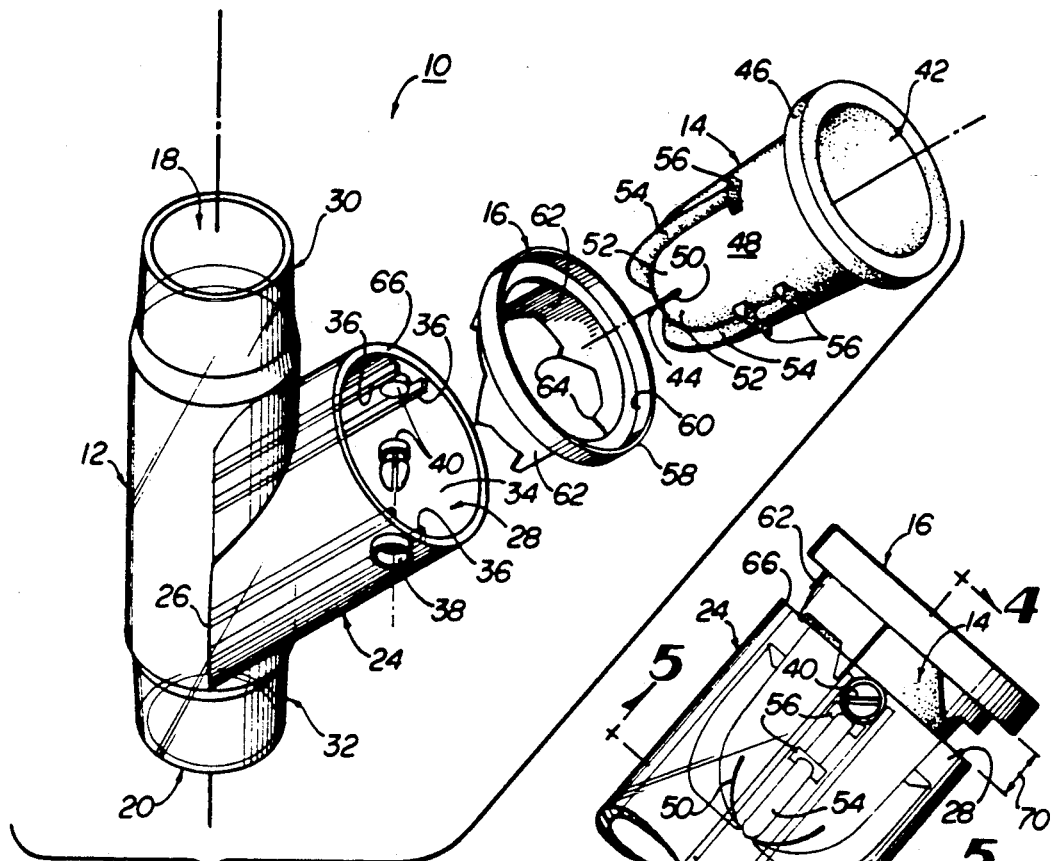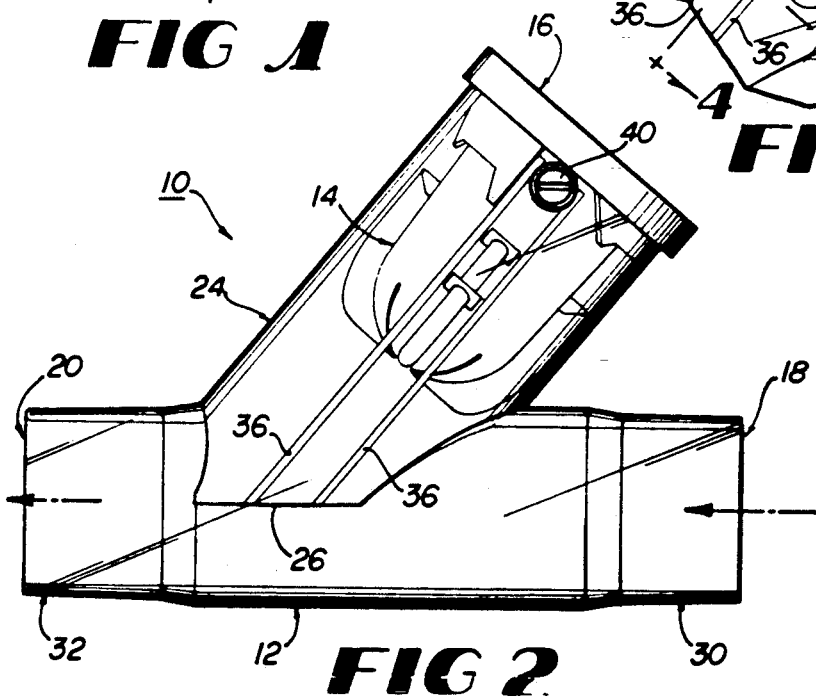

AUTOMATIC RELIEF VALVE

This application is a Continuation-in-Part application of Ser. No. 07/469,359, filed Jan. 24, 1990, now U.S. Pat. No. 5,033,504 entitled "Automatic Relief Valve," which is incorporated herein by reference.

BACKGROUND OF THE INVENTION

The present invention relates to a relief valve used in combination with suction-operated automatic swimming pool cleaners. Suction-operated automatic swimming pool cleaners typically operate by connecting a long flexible hose between the cleaner and the water inlet of the swimming pool skimmer or weir. The skimmer or weir contains the inlet to the swimming pool filter system. The flexible hose used to connect the swimming pool cleaner generally is made up of several sections connected together by friction couplings. Water is drawn through the pool cleaner and the flexible hose by the filter pump. The suction produced by the filter pump is used by the pool cleaner as a motive force to randomly move the pool cleaner about the horizontal and vertical surfaces of the pool and to help hold the pool cleaner against the sides of the pool being cleaned, as well as drawing dirt and debris into the pool filter.

Suction-operated pool cleaners require a relatively steady, even flow of water for proper operation. Excessive flow causes the pool cleaner to adhere firmly to the pool in one position and not randomly move about all the pool surfaces. In addition the kinetic energy released by water moving within the flexible hose when the filter pump suddenly shuts off has a tendency to separate the flexible hose at its couplings, disabling the pool cleaner (an unacceptable result for a device which is designed to be totally automatic and require no attention from the pool owner). Therefore, it is important that suction-operated pool cleaners be supplied with a steady, even flow of water.

One problem with prior art relief valves is that when the swimming pool cleaner is connected to the pool skimmer or weir, the inlet to the skimmer or weir is plugged, and debris floating on the surface of the pool is not drawn through the pool filter and instead collects on the pool strainer. This accumulation of debris on the strainer must be removed manually by the pool owner, a dirty task that detracts from the otherwise enjoyable aspects of pool ownership. Accordingly, it is desirable to provide some means of allowing floating debris to be drawn into the pool filter system simultaneously with the operation of the automatic pool cleaner.

BRIEF SUMMARY OF THE INVENTION

The relief valve of the present invention is designed to attach, partially submerged in the pool water, between the filter pump skimmer or weir inlet and the flexible hose which is connected to the automatic pool cleaner. The relief valve comprises a body having a flow passage with an inlet on one end and an outlet on the other end. A bypass passage branches off from and is in communication with the flow passage on one end, is open to ambient conditions on the other end and terminates either at or slightly below the water surface of the pool. A movable, resilient diaphragm having a perforation, guide ribs and a peripheral flange is suspended within the open end of the bypass passage. The diaphragm ribs have guides that slide within channels on the interior of the bypass passage and are prevented from sliding out of the channels by retaining pins. The diaphragm is prevented from being pulled into the flow passage by the flange, which is of larger diameter than the bypass passage and engages the rim of the open end of the bypass passage.

A rotatable collar having a recessed ring to receive the flange is slipped over the diaphragm. The collar has sets of projections of various lengths that extend down the length of the diaphragm and engage the retainer pins. Rotating the collar brings a different set of projections into contact with the retainer pins and causes the flange to be held varying distances away from the rim of the bypass passage. If desired, the collar can be rotated so that none of the projections engage the retainer pins, allowing the underside of the flange-bearing recessed ring of the collar to seal against the rim of the bypass passage.

The relief valve of the present invention has three functions. When the water flow created by the filter pump is too great, the perforation in the flexible diaphragm is drawn open, permitting extra pool water to enter the system through the bypass passage and thus reduce the negative pressure in the system to within the optimum operating range for the pool cleaner. When the filter pump is suddenly shut off, the pressure build-up within the system is instantly released around the flange and through the bypass passage, thus helping to prevent the friction couplings of the flexible hose from blowing apart.

This two-way pressure relief action results regardless of the position of the collar. However, when the collar is rotated so that one set of projections engages the retaining pins, the diaphragm flange is held a small distance away from the rim of the bypass passage. The resulting small gap allows floating debris to be draw into the bypass passage past the diaphragm and subsequently into the pool filtering system where it is removed. The use of multiple projections of varying length allows the gap to be set at varying amounts.

Accordingly, one objective of the present invention is to provide a relief valve that operates at ambient conditions.

Another objective of the present invention is to provide a relief valve that is inexpensive to manufacture.

Another objective of the present invention is to provide a relief valve that is simple in operation.

Still another objective of the present invention is to provide a relief valve that operates to both vent excess pressure and relieve vacuum.

A further objective of the present invention is to provide a relief valve that also operates to skim debris off the surface of water.

These and other objectives and advantages of the present invention will be apparent from the detailed description and drawing and the claims that follow.

BRIEF DESCRIPTION OF THE DRAWINGS

FIG. 1 is a perspective view of the relief valve of the present invention with the collar and diaphragm exploded away from the body.

FIG. 2 is an elevational view of the relief valve shown in FIG. 1 with the collar installed on the diaphragm and the diaphragm shown in phantom fully inserted into the bypass passage of the body.

FIG. 2A is an elevational view of the bypass passage shown in FIG. 2 with the collar-bearing diaphragm shown in partial phantom and partially ejected from the bypass passage.

DETAILED DESCRIPTION OF THE DRAWINGS

Figure 3:
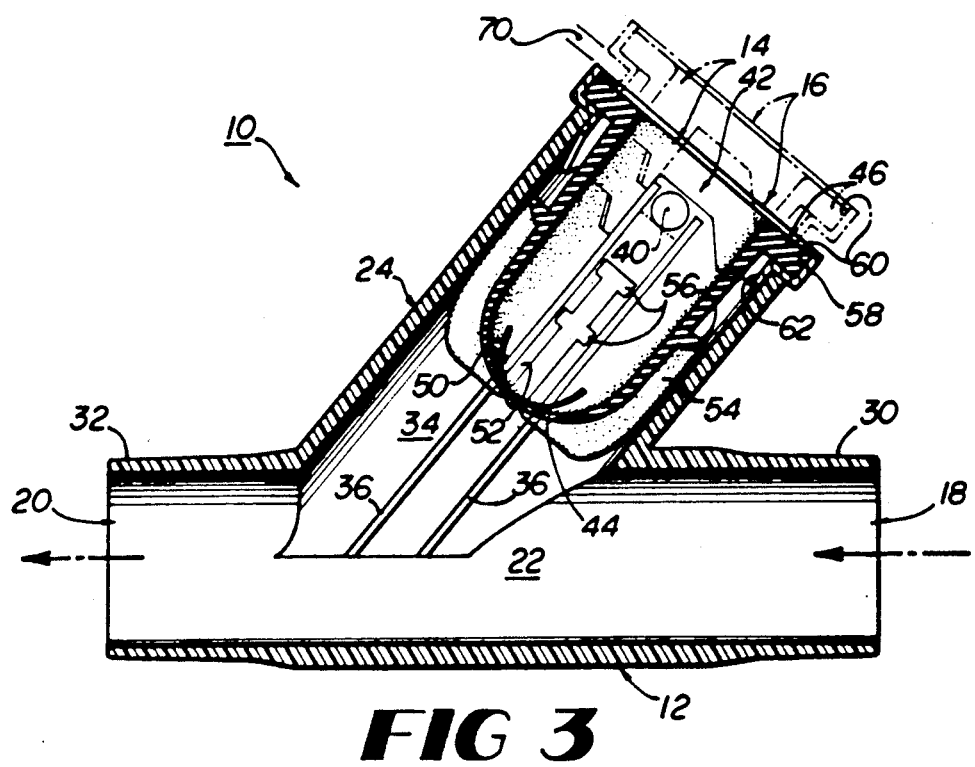
FIG. 3 is a cross sectional view of the valve shown in FIG. 2.

As shown in FIGS. 1, 2 and 3, relief valve 10 generally comprises body 12, diaphragm 14 and collar 16. Body 12 is hollow, generally Y-shaped and has an inlet 18 and outlet 20 which communicate through flow passage 22. Inlet end 30 and outlet end 32 of body 12 narrow or taper slightly so as to permit ends 30 and 32 to frictionally engage the end of a pool cleaner flexible hose (not shown). Body 12 is preferably made out of transparent plastic, but other suitable materials, including opaque and colored materials.

Flow passage 22 is intersected at approximately midpoint by bypass passage 24, which communicates with flow passage 22 at one end 26 and is open to ambient conditions at free end 28. Interior 34 of bypass passage 24 contains parallel ridges 36 extending down opposite side of the entire length of bypass passage 24. Holes 38 penetrate free end 28 between ridges 36 and receive split retaining pins 40.

Figure 4:
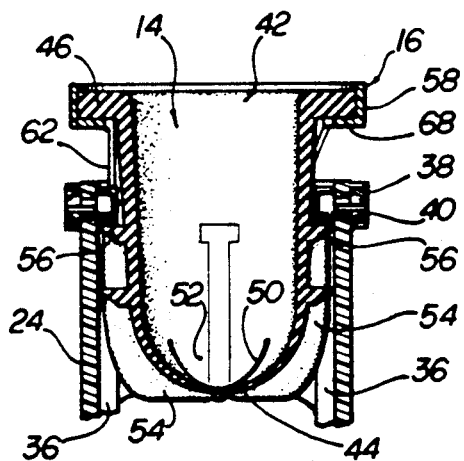
FIG. 4 is a longitudinal cross sectional view of the diaphragm installed in the bypass passage taken along line 4—4 in FIG. 2A.
Figure 5:
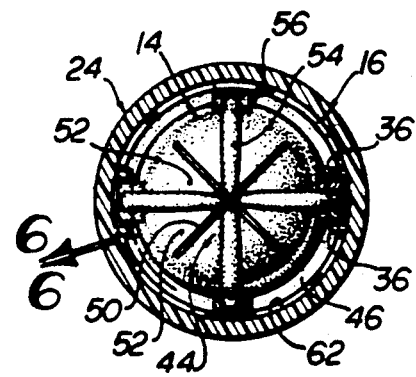
FIG. 5 is a cross sectional view of the bypass passage showing the closed end of the diaphragm in perspective, taken along line 5—5 in FIG. 2A.

As seen in FIGS. 3, 4 and 5, diaphragm 14 is hollow and generally tubular in shape, slightly smaller in exterior diameter than the interior diameter of bypass passage 24, open on one end 42, rounded and closed on opposite end 44 and preferably made from a flexible material. Open end 42 contains a peripheral flange 46 projecting radially around the exterior 48 of diaphragm 14. Closed end 44 contains perpendicular slits 50 that form identical flaps 52 in end 44. Centering ribs 54 on exterior 48 of diaphragm 14 contain guides 56 and extend longitudinally down diaphragm 14 terminating at the intersection of slits 50.

As can be seen in FIGS. 1, 2A, 3, 4 and 6, collar 16 generally comprises a circular ring 58 having a recess 60. Flange 62 projects from underside 68 of ring 58 opposite recess 60 and contains stepped serrations 64. Serrations 64 are preferably on the order of one-eighth to five-sixteenths inch, but other suitable lengths may also be used. Collar 16 may be made of any suitable material, such as plastic, and is preferably opaque or semi-opaque.

As shown in FIGS. 2, 2A, 3, 4 and 5, diaphragm 14 is threaded into collar 16 so that diaphragm flange 46 nests within recess 60. Diaphragm 14, bearing collar 16, is telescopically inserted into open end 28 of bypass passage 24 of body 12 so ribs 54 are pushed passed retaining pins 40 and guides 56 slide within ridges 36. While ribs 54 should be able to be forced passed pins 40 by hand, in normal use, pins 40 should be of adequate length to prevent diaphragm 14 from being ejected from bypass passage 24. Once installed, ribs 54 and guides 56 of diaphragm 14 can freely slide within bypass passage 24 but their travel is limited by pins 40 contacting guides 56 and by underside 68 of ring 58 contacting edge 66 of end 26 of bypass passage 24 as shown in FIG. 2A.

In use, outlet end 32 of body 12 is connected to the swimming pool filter system skimmer (not shown) so that open end 28 of bypass passage 24 is submerged proximate to the surface of the swimming pool water. Inlet end 30 of body 12 is connected to the swimming pool cleaner flexible hose (not shown). Once the swimming pool filter pump is turned on, valve 10 maintains a steady pressure level within the system. Under normal circumstances, the system maintains a negative pressure, i.e., a lower pressure than the ambient pool pressure, and underside 68 of ring 58 is drawn into engagement with edge 66 of bypass passage 24, as shown in FIG. 2, preventing diaphragm 14 from being drawn into body 12. However, if the pressure within the system becomes too low for proper pool cleaner performance, flaps 52 in diaphragm 14 are drawn open, allowing more water to enter the system and increasing the pressure. Ribs 54 in diaphragm 14 act to stiffen flaps 52 and prevent flaps 52 from opening prematurely. Adjustment of the size and shape of ribs 54 permits flaps 52 to be made that open in response to differing pressures.

Diaphragm 14 also vents the excess pressure caused by the inertia of the water moving through the system and the cycling of the filter pump. Because diaphragm 14 can move freely within bypass passage 24 and is of slightly smaller diameter, a sudden rise in system pressure causes diaphragm 14 to be partially ejected from bypass passage 24, as shown in FIGS. 2A, 3 and 4, allowing the excess pressure to be vented around diaphragm 14 and out end 28 of bypass passage 24. Diaphragm 14 is prevented from being totally ejected by guides 56 contacting retaining pins 40.

Figure 6:
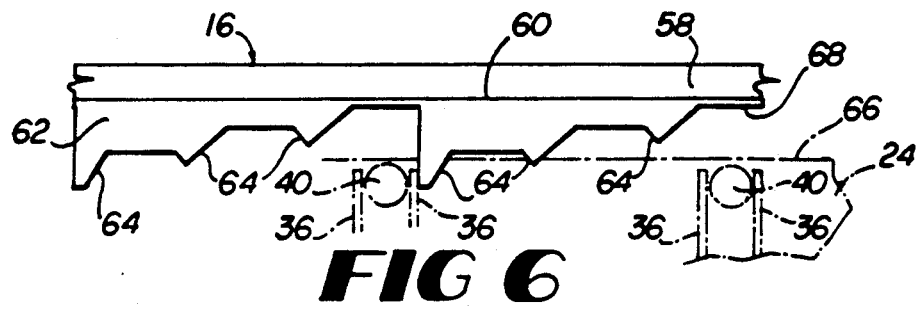
FIG. 6 is an elevational view of the collar shown in FIG. 1 which has been sectioned along line 6—6 in FIG. 5 and laid flat.

Diaphragm 14 can be prevented from totally sealing off end 26 of bypass passage 24 by use of stepped serrations 64 on collar 16. As shown in FIGS. 2A, 4 and 6, by rotating collar 16 on diaphragm 14, underside 68 of ring 58 can be prevented from contacting edge 66. Instead, serrations 64 contact pins 40, creating a small gap 70, of varying width depending on the length of serrations 64 used, between underside 68 and edge 66. Gap 70 allows debris to enter body 12 without interfering with the normal two-way operation of the valve described above. However, if serrations 64 of sufficient length are used so as to force guides 56 to rest against pins 40, diaphragm 14 will be prevented from sliding within bypass passage 24.

This description is given for purposes of illustration and explanation. It will be apparent to those skilled in the relevant art that modifications and changes may be made to the invention described above without departing from is scope and spirit.

I claim:
1. A relief valve comprising:
   a) a body;
   b) a flow passage through the body having an inlet and an outlet for connection to a pipe having an induced flow therethrough;
   c) a bypass passage through the body connected to the flow passage having an interior and open to ambient conditions at a free end;
   d) a diaphragm that slides coaxially within the interior of the bypass passage at the free end having a peripheral flange and a perforation permitting flow therethrough in only one direction and variable in size depending upon the degree of flexing of the diaphragm;

e) a means for guiding the sliding of the diaphragm within the bypass passage; and f) a means for allowing debris to enter the bypass passage around the diaphragm.

2. The relief valve of claim 1 wherein the debris allowing means comprises a collar having a ring with a recess to receive the flange and serrated projections that engage retaining pins journaled through holes in the free end.

3. The relief valve of claim 1 wherein the perforation is formed by a plurality of slits through the diaphragm.

4. The relief valve of claim 1 wherein the bypass passage contains a restriction at the free end and the diaphragm contains cooperating members movable in the guiding means to prevent complete withdrawal of the diaphragm from the bypass passage.

5. The relief valve of claim 1 wherein the body, diaphragm and collar are comprised of plastic.

6. The relief valve of claim 2 wherein the serrated projections are between approximately zero and five-sixteenths inch long.

7. The relief valve of claim 1 wherein the guiding means comprises parallel ridges in the interior of the bypass passage.

8. A relief valve comprising:

a) a body;

b) a flow passage through the body having an inlet and an outlet for connection to a pipe having an induced flow therethrough;

c) a bypass passage through the body connected to the flow passage and open to ambient conditions at a free end and having longitudinal guiding means on its inner surface and a restriction at the free end;

d) a flexible resilient diaphragm that slides coaxially within the bypass passage having a peripheral flange and a perforation permitting flow therethrough in only one direction and variable in size depending upon the degree of flexing of the diaphragm, and cooperating members movable in the guiding means to prevent complete withdrawal of the diaphragm from the bypass passage; and e) a collar having a ring with a recess that receives the flange and having serrated projections that engage the restriction.

9. The relief valve of claim 8 wherein the body, diaphragm and collar are comprised of plastic.

10. The relief valve of claim 8 wherein the guiding means comprises parallel ridges.

11. The relief valve of claim 8 wherein the serrated projections are between approximately zero and five-sixteenths inch long.

* * * * *